United States Patent
Donovan et al.

(10) Patent No.: US 7,010,841 B2
(45) Date of Patent: Mar. 14, 2006

(54) INTERIOR ATTACHMENT APPARATUS AND METHOD FOR A VEHICLE COMPONENT

(75) Inventors: Jeffrey M. Donovan, St. Clair Shores, MI (US); James B. Cook, Bois-le-Roi (FR); Sachin Shah, Troy, MI (US); Holly R. Hecker, Rochester, MI (US); John L. Adams, Clinton Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/295,077

(22) Filed: Nov. 15, 2002

(65) Prior Publication Data

US 2004/0212223 A1    Oct. 28, 2004

Related U.S. Application Data

(60) Provisional application No. 60/407,351, filed on Aug. 30, 2002.

(51) Int. Cl.
*B60J 7/043*    (2006.01)

(52) U.S. Cl. .................... 29/423; 29/401.1; 29/428; 29/462; 29/525.01; 224/331; 296/216.07

(58) Field of Classification Search .............. 29/401.1, 29/428, 462, 423, 525.01; 224/311; 296/216.01, 296/216.04, 216.07
See application file for complete search history.

(56) References Cited

U.S. PATENT DOCUMENTS 5,303,970 A * 4/1994 Young et al. .............. 296/37.7
5,667,896 A * 9/1997 Carter et al. .............. 428/425.6
5,825,096 A   10/1998 Morimoto et al.
6,493,915 B2 * 12/2002 Zonneveld et al. ........ 29/401.1

FOREIGN PATENT DOCUMENTS

| GB | 1 595 880 | 8/1981 |
|---|---|---|
| GB | 2 273 086 | 6/1994 |
| JP | 08-310299 | * 11/1996 |
| JP | 10-086748 | * 4/1998 |
| JP | 2001-332858 | * 4/2001 |
| JP | 2001112078 | 4/2001 |

OTHER PUBLICATIONS

OEM Video Entertainment System. BenzWorld Publ., available at http://www.benzworld.org/publications/pub.asp?id=127. Marc 25, 2003.*
ML-VES Installation Bulletin (various), availiable at http://phdwebsite.powerpulse.cc/VES%20Documents/VES%20Install%20Documents.pdf. Marhc, 10, 2003 (Mar. 10, 2000).*
Mobilevideo4less.com sales brochure for 8" WideScreen DVD or VHS Package, available at http://www.mobilevideo4less.com/Merchant2merchant.mv?Screen=PROD&Store_Code=MV&Product_Code=FD8MWPKG . 2001.*

* cited by examiner

Primary Examiner—Eric Compton
(74) Attorney, Agent, or Firm—MacMillan, Sobanski & Todd, LLC

(57) ABSTRACT

A mount assembly and method are provided for securing a component to an interior mounting surface in a vehicle having a sunroof. Initially, a sunroof frame is provided. The sunroof frame includes a cross-member disposed laterally relative to a longitudinal axis of the vehicle. The component is then attached to the cross-member of the sunroof frame such that the cross-member supports the weight of the component.

9 Claims, 5 Drawing Sheets

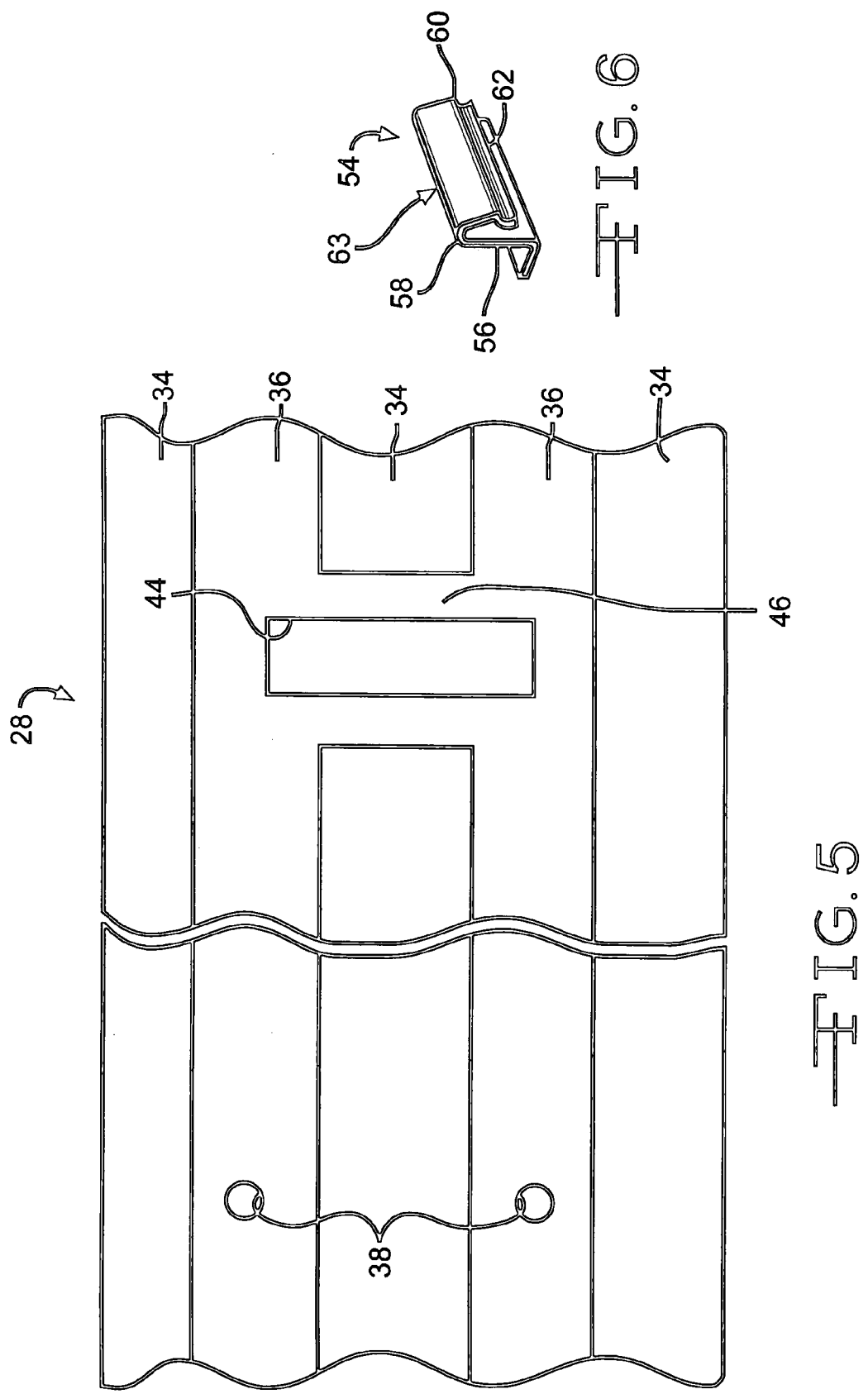

INTERIOR ATTACHMENT APPARATUS AND METHOD FOR A VEHICLE COMPONENT

CROSS REFERENCE TO RELATED APPLICATION

This application claims the benefit of U.S. Provisional Application Ser. No. 60/407,351, filed Aug. 30, 2002.

BACKGROUND OF THE INVENTION

The present invention relates to attachment apparatus and more particularly to a mount assembly and method for securing a component to an interior mounting surface in a vehicle having a sunroof.

Some passenger vehicles include overhead entertainment systems which are attached to an interior vehicle mounting surface, such as the roof of the vehicle. However, such entertainment systems are typically not provided in vehicles which have a sunroof. Vehicles with sunroofs typically include a sunroof frame mounted between the headliner and the roof. Such a frame reduces occupant headroom relative to vehicles without a sunroof. The sunroof frame also typically lacks the structural strength to support an entertainment system if attached thereto. It would therefore be desirable to provide an improved mount assembly and method for securing a component to an interior vehicle mounting surface in a vehicle having a sunroof.

SUMMARY OF THE INVENTION

This invention relates to an improved mount assembly and method for securing a component to an interior mounting surface in a vehicle having a sunroof. Initially, a sunroof frame is provided. The sunroof frame includes a cross-member disposed laterally relative to a longitudinal axis of the vehicle. The component is then attached to the cross-member of the sunroof frame such that the cross-member supports the weight of the component. Preferably, the component is first temporarily attached the cross-member at a first mounting location such that a gap is defined between the component and the vehicle mounting surface. Access to a component power cable is then provided within the gap between the component and the vehicle mounting surface. The component power cable is then connected between the component and a source of vehicle power. The component is then disposed adjacent the vehicle mounting surface so as to close the gap between the component and the vehicle mounting surface. The component is preferably attached to the cross-member of the sunroof frame at a second mounting location. Preferably, the component is temporarily attached to the cross-member by a spring clip.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a schematic view of the cross-member illustrated in FIGS. 1 and 3.

FIG. 6 is a perspective view of the spring clip illustrated in FIGS. 1 through 4.

DETAILED DESCRIPTION OF THE INVENTION

Figure 1:
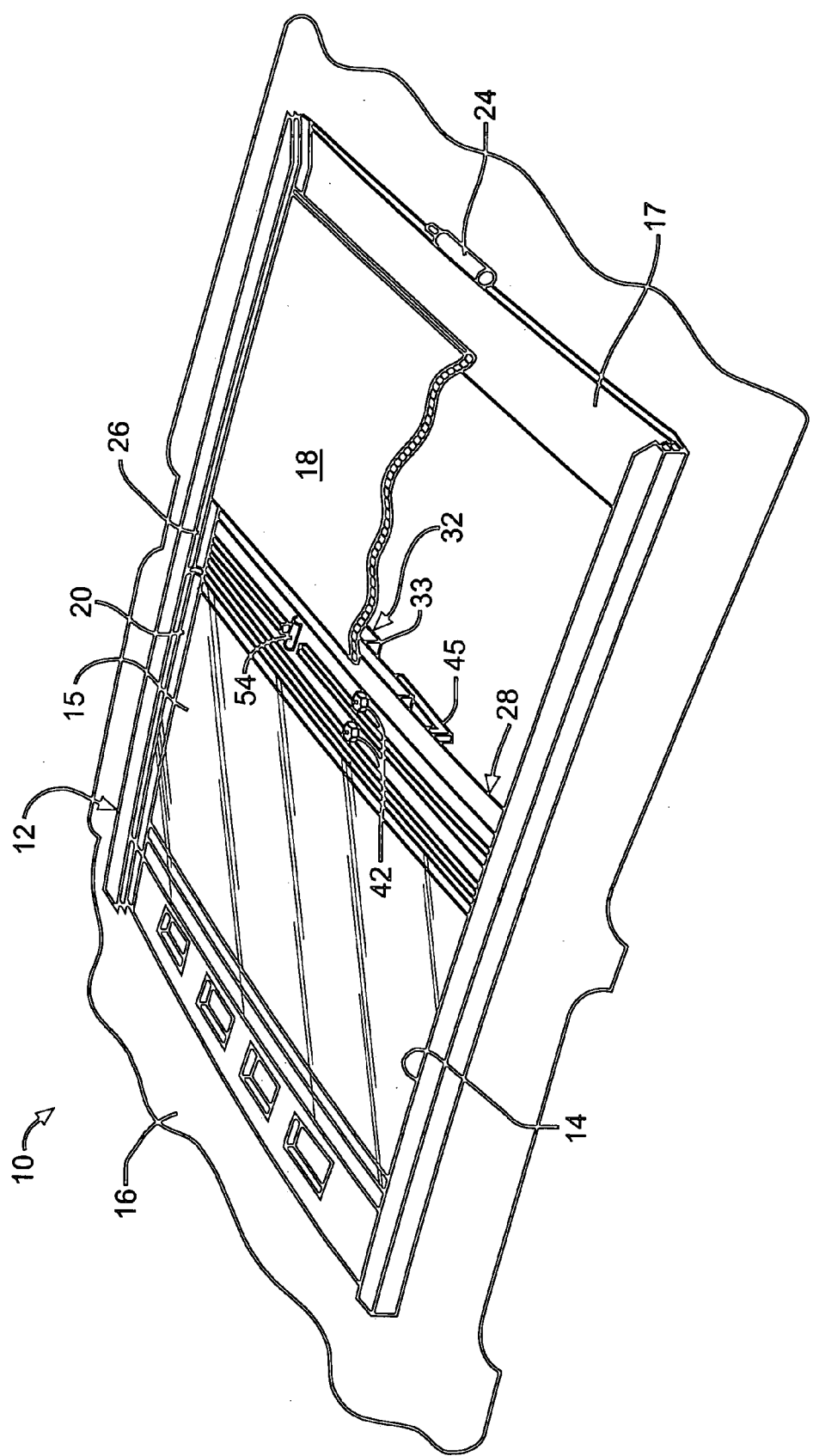
FIG. 1 is a fragmentary perspective view of a sunroof assembly according to the invention, as installed in a vehicle and showing the Family Entertainment System mounted to the cross-member of the sunroof frame.

Referring to FIG. 1, a sunroof assembly is illustrated generally at 10. The sunroof assembly is shown as viewed from above, and with the outer vehicle roof removed. As viewed in FIG. 1, a headliner 16 is shown disposed below the sunroof assembly 10. The sunroof assembly 10 includes a bow or a frame 12 defining an opening 14. If desired, the opening 14 can have a sun-filtering device, such as a glass panel 15 mounted therein, although such is not required. The glass panel 15 is preferably tinted glass.

Figure 2:
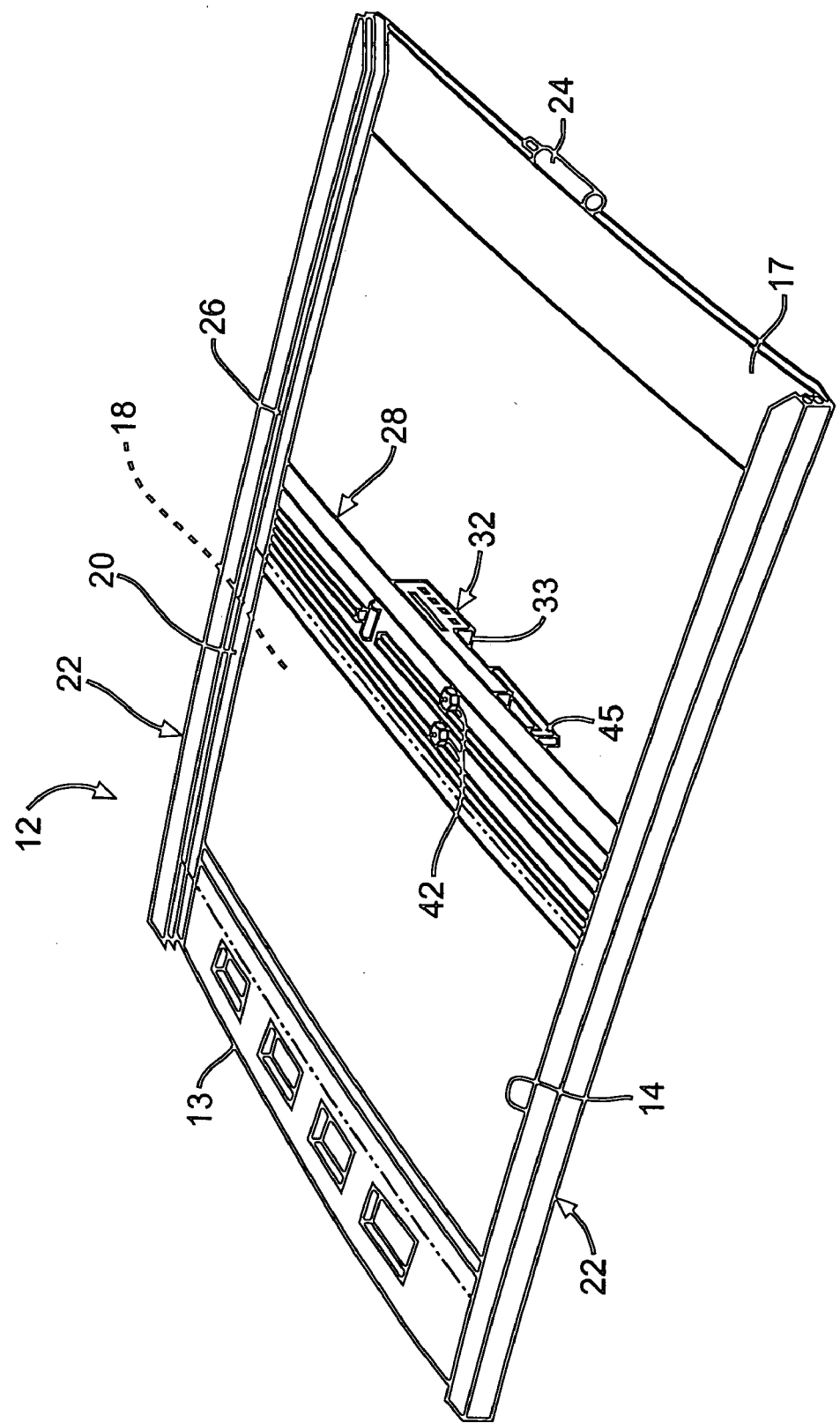
FIG. 2 is a perspective view of the sunroof frame illustrated in FIG. 1, showing the Family Entertainment System mounted thereto.

As best shown in FIG. 2, the sunroof frame 12 is preferably generally rectangular and includes longitudinal sides 22. A forward portion 13 extends laterally between the sides 22. The sides 22 and the forward portion 13 are preferably formed of a substantially rigid material, such as steel, although such is not required. The frame 12 is attached to the vehicle roof (not shown) by welding, although such is not required. The sunroof frame 12 can also be attached to the vehicle roof by any other desired method.

As shown in FIG. 1, a sunshade 18 is slidably mounted relative to the sides 22. Preferably, the sunshade 18 is slidably mounted within inwardly facing sunshade tracks 20 defined by the opposite sides 22 of the frame 12. The sunshade 18 is preferably mounted within the sunshade tracks 20 such that the sunshade 18 is selectively and longitudinally movable between a fully open position, as shown in FIG. 1, and a fully closed position, as shown by a phantom line in FIG. 2. In the fully closed position the sunshade 18 covers the opening 14. In the fully open position the sunshade 18 is preferably stored between the vehicle roof and the headliner 16. Preferably, the sunshade 18 is urged between the closed position and the open position by a driving means, such as a motor 24, although such is not required. The sunshade 18 can also be moved manually, or moved by any other desired method.

If desired the glass panel 15 can be slidably mounted relative to the sides 22. Preferably, the glass panel 15 is slidably mounted within inwardly facing glass panel tracks 26 defined by opposite sides 22 of the frame 12. The glass panel 15 is preferably selectively and longitudinally movable between a fully closed position wherein the glass panel 15 covers the opening 14, as shown in FIG. 1, and a fully open position wherein the glass panel 15 is stored between the vehicle roof and the headliner 16. Preferably the glass panel tracks 26 are defined above the sunshade tracks 20, such that the glass panel 15 is disposed between the sunshade 18 and the vehicle roof. Preferably, the glass panel 15 is also urged between the closed position and the open position by a driving means, such as the motor 24, although such is not required. The glass panel 15 can also be moved manually, or moved by any other desired method.

Although the sunroof assembly 10 has been described in the context of a sliding sunshade 18, such is not required. The sunroof assembly 10 can be any desired type of sunroof, such as a tilt-up sunroof, or a folding sunroof.

As shown in FIGS. 1 and 2, the frame 12 further includes a cross-member 28 disposed intermediate the forward portion 13 and a rear portion 17 of the frame 12. Preferably, the cross-member is formed of a substantially rigid material, such as steel, although such is not required. The cross-member 28 extends laterally between the sides 22. Preferably, the cross-member 28 is welded to the frame 12, although such is not required. The cross-member 28 can also be attached to the frame 12 by any desired method. The cross-member 28 provides structural integrity to the sunroof assembly frame 12. The cross-member 28 further provides a convenient and efficient mounting structure for a mount assembly 30 of a family entertainment system (FES) 32, as will be described herein, and has sufficient strength so as to support the weight of the FES 32.

Preferably, the rear portion 17 is attached to the frame 12. Preferably, the rear portion 17 is formed of a relatively light-weight polymeric material, such as plastic, although such is not required. The rear portion can be attached to the frame 12 by any desired method, such as threaded fasteners, although such is not required. The rear portion 17 can also be attached to the frame 12 by any other desired method. The rear portion 17 provides a convenient and efficient mounting structure for a sun roof component, such as the motor 24, and has sufficient strength so as to support the weight of the motor 24. If desired, the rear portion 17 can also provide structural integrity to the sunroof assembly frame 12.

Figure 3:
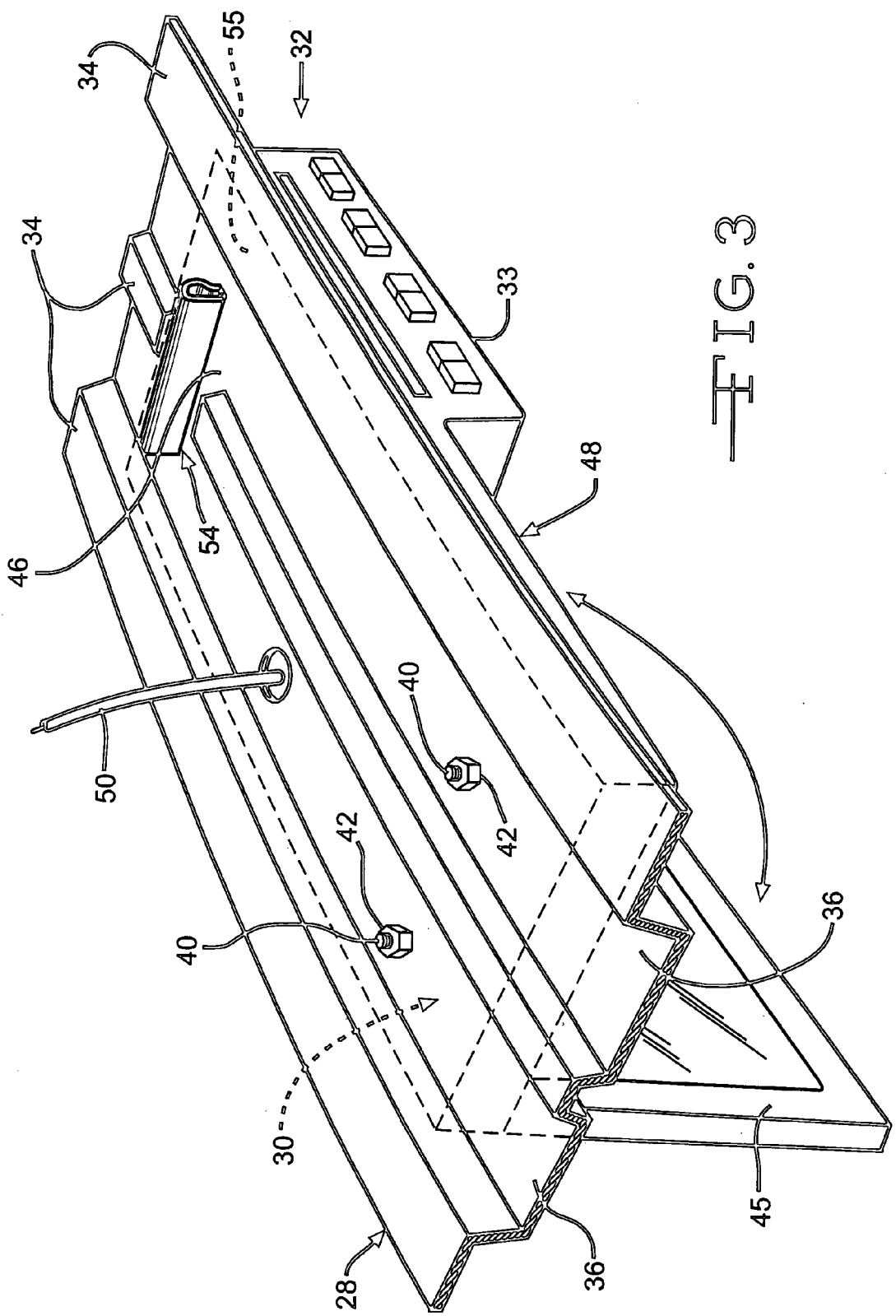
FIG. 3 is an enlarged perspective view of the Family Entertainment System and cross-member illustrated in FIG. 1.
Figure 4:
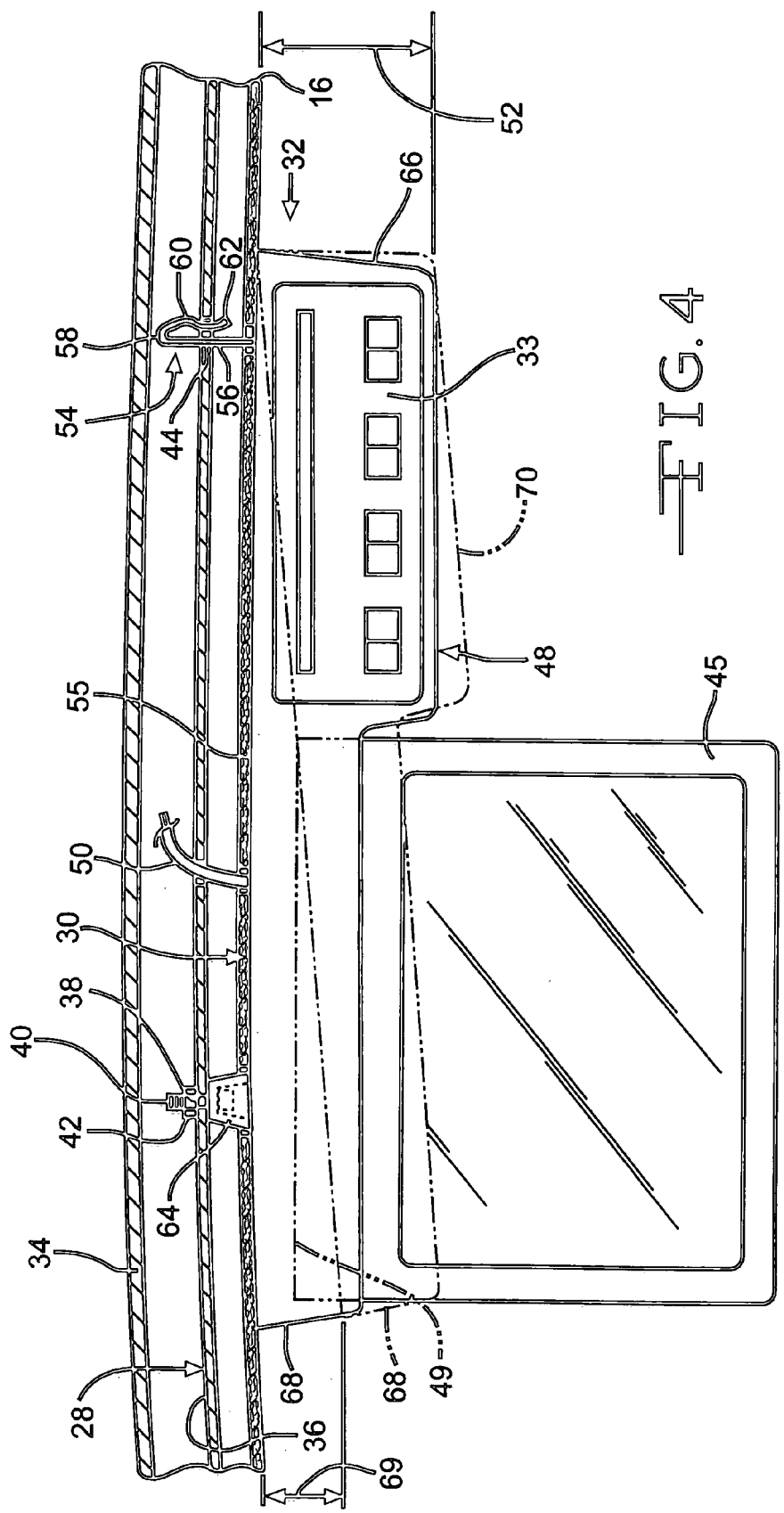
FIG. 4 is a front plan view, partially in cross section, of the Family Entertainment System illustrated in FIGS. 1 and 3, showing the Family Entertainment System in an upwardly extending position, a phantom line illustrating the Family Entertainment System in the downwardly extending position.

Referring to FIGS. 3, 4 and 5, the cross-member 28 preferably includes substantially parallel strengthening ridges 34 which define channels 36 therebetween. The illustrated cross-member 28 includes three ridges 34 and two channels 36, although such is not required. The cross-member 28 can include any desired number of ridges 34 and channels 36, or can be formed without such ridges and channels. Fastener apertures 38 are formed in the channels 36. Preferably, the apertures 38 are threaded so as to receive threaded fasteners 40. More preferably, threaded nuts 42 are attached, such as by welding, about the apertures 38. A clip opening 44 is formed in a transversely formed groove 46. Preferably, the groove 46 is substantially centrally located on the cross-member 28.

Preferably, the FES 32 includes a digital video disk (DVD) player 33 and video monitor or screen 45, although such is not required. The screen 45 is preferably pivotally mounted within a housing 48. Such pivotal mounting allows the screen 45 to be pivoted between a stored position within the housing 48, as shown by phantom line 49 in FIG. 4, and a deployed position wherein the screen 45 can be viewed by vehicle occupants. The FES 32 can also include any desired entertainment or display device, such as a video cassette recorder/player (VCR), or other player of prerecorded video signals pre-stored onto removable media. Preferably, the FES 32 includes the mount assembly 30.

The mount assembly 30 includes a housing 48 in which the DVD player and video monitor are disposed. An electrical wiring harness 50 for connecting the DVD player and video screen 45 a source of vehicle power (not shown) extends from the housing 48, although such is not required. For example, the wiring harness 50 can extend from the source of vehicle power for attachment to a corresponding electrical connector on the housing 48.

Preferably, the screen 45 and the DVD player 36 are adjacent one another within the housing 48 so that the housing 48 has a relatively small height 52. The relatively small height 52 advantageously provides improved rear vision for the vehicle driver, and maximizes the interior vehicle space available for the vehicle occupants.

The mount assembly 30 further includes the spring clip 54 and threaded fasteners 40 disposed on an upper surface 55 of the housing 48. As best shown in FIGS. 4 and 6, the spring clip 54 includes a generally elongated body 63. The body 63 includes a first or upwardly extending portion 56 (as viewed in FIG. 6), a shoulder portion 58, a resilient outwardly bent central portion 60, and a downwardly bent wing portion 62.

Preferably, the spring clip 54 is formed from a substantially rigid material such as steel, although the spring clip 54 can also be formed from any other desired material. The spring clip 54 can be attached to the housing 48 by any desired method such as threaded fasteners (not shown), although such is not required. For example, the spring clip 54 can also be integrally molded into the housing 48.

Preferably, the threaded fasteners 40 are disposed within fastener housings 64. The fastener housings 64 illustrated in FIG. 4 include trapezoidal side portions, although such is not required. The fastener housings 64 can also be of any desired shape.

As best shown in FIG. 4, to install the FES 32 in a vehicle, the spring clip 54 is first inserted into the clip opening 44. As the spring clip 54 is inserted into the clip opening 44, the upwardly extending portion 56 and the outwardly bent central portion 60 engage the opening 44, thereby causing the resilient central portion 60 to be deflected inwardly. Once the spring clip 54 is inserted a predetermined depth through the opening 44, the resilient central portion 60 springs outwardly such that the upwardly extending portion 56 and the wing 62 engage an inner surface of the opening 44, thereby temporarily attaching the FES 32 to the frame 12.

Preferably, the FES 32 is temporarily attached to the frame 12 such that the housing 48 is in a first position. In the first position, as shown by phantom line 70 in FIG. 4, a first side 66 of the housing 48 is in an upwardly extending position substantially adjacent the headliner 16. A second side 68 of the housing 48 is in a downwardly extending position such that a gap 69 is defined between the housing 48 and the headliner 16. The gap 69, defined when the housing 48 is in the first position, advantageously provides an FES installer with convenient access to the wiring harness 50, and allows the FES installer to connect the wiring harness 50 to the source of vehicle power. After the wiring harness 50 is connected to the source of vehicle power, the second side 68 of the housing 48 is preferably moved adjacent the headliner 16. The threaded fasteners 40 can then be threaded into the threaded nuts 42 through tool access openings 72, thereby securing the FES 32 to the cross-member 28.

Advantageously, an FES 32 provided with the mount assembly 30 can be mounted to any sunroof cross-member having the apertures 38 and the clip opening 44 corresponding to the threaded fasteners 40 and the spring clip 54 of the mount assembly 30.

Although the FES mount assembly 30 has been described in the context of mounting to a cross-member 28 of a sunroof assembly 10, such is not required. For example, the mount assembly 30 according to the invention can be mounted to any interior vehicle mounting surface, such as a structural support portion of a vehicle roof having no sunroof.

The principle and mode of operation of this invention have been described in its preferred embodiment. However, it should be noted that this invention may be practiced otherwise than as specifically illustrated and described without departing from its scope.

What is claimed is:

1. A method of securing a component to a vehicle mounting surface in a vehicle having a sunroof, the method comprising the steps of:
   a. providing a sunroof frame including a cross-member disposed laterally relative to a longitudinal axis of the vehicle; and
   b. temporarily attaching the component to the cross-member by a spring clip at a first mounting location such that a gap is defined between the component and the vehicle mounting surface; and
   c. attaching the component to the cross-member of the sunroof frame, the cross-member supporting the weight of the component.

2. The method according to claim 1, wherein the component is an entertainment system, the entertainment system comprising a video screen, and one of a digital video disk player, video cassette recorder/player, and a player of pre-recorded video signals pre-stored onto removable media.

3. The method according to claim 1, wherein the component has a low profile such that vehicle occupant headroom relative to the component is maximized.

4. The method according to claim 1, further including a step (d) subsequent to step (b), wherein step (d) includes connecting a component power cable between the component and a source of vehicle power, the power cable being disposed within the gap between the component and the vehicle mounting surface.

5. The method according to claim 4, further including a step (e) subsequent to step (d), wherein step (e) includes disposing the component adjacent the vehicle mounting surface, thereby closing the gap between the component and the vehicle mounting surface.

6. The method according to claim 5, wherein step (b) further includes attaching the component to the cross-member of the sunroof frame at a second mounting location.

7. The method according to claim 1, wherein the spring clip comprises a generally elongated body, the body including a first portion, a resilient outwardly bent central portion, a shoulder portion disposed between the first portion and the central portion, and a wing portion extending outwardly from the central portion.

8. The method according to claim 6, wherein the component is attached to the cross-member by a threaded fastener.

9. The method according to claim 1, wherein the vehicle mounting surface is a structural cross-member of a vehicle sunroof assembly.

* * * * *